United States Patent [19]

Sakurai et al.

[11] Patent Number: 4,527,534

[45] Date of Patent: Jul. 9, 1985

[54] FUEL INTAKE CONTROL SYSTEM FOR SUPERCHARGED ENGINE

[75] Inventors: Shigeru Sakurai; Hiroyuki Oda; Haruhiko Satow; Haruo Okimoto, all of Hiroshima, Japan

[73] Assignee: Mazda Motor Corporation, Hiroshima, Japan

[21] Appl. No.: 414,861

[22] Filed: Sep. 3, 1982

[30] Foreign Application Priority Data

Sep. 7, 1981 [JP] Japan .................. 56-140535
Sep. 7, 1981 [JP] Japan .................. 56-140536

[51] Int. Cl.³ .................................... F02B 33/36
[52] U.S. Cl. ........................... 123/559; 123/432
[58] Field of Search .......... 60/611; 123/213, 432, 123/559, 564

[56] References Cited

U.S. PATENT DOCUMENTS 3,964,451 6/1976 Goto .................... 123/432
4,315,489 2/1982 Tadokoro et al. ............. 123/213

FOREIGN PATENT DOCUMENTS 657993 3/1938 Fed. Rep. of Germany ...... 123/564
85522 7/1981 Japan .................. 123/432

OTHER PUBLICATIONS

"Supercharging for Fuel Economy", Buike et al., *Automotive Engineering*, vol. 89, No. 6, Jun. 1981, pp. 39–43.

*Primary Examiner*—Michael Koczo
*Attorney, Agent, or Firm*—Burns, Doane, Swecker & Mathis

[57] ABSTRACT

A fuel intake control system for a supercharged engine including an engine driven supercharger comprises a primary intake passage having a primary throttle valve for controlling the flow of an air-fuel mixture to be supplied to the engine, and an auxiliary intake passage having an auxiliary throttle valve for controlling the flow of at least an air supercharged by the supercharger and adapted to be supplied to the engine. The pressure of the discharged air by the supercharger during a particular engine operating condition is adjusted in dependence on the load imposed on the engine in such a way as to increase with increase of the load. This can be accomplished by controlling the flow of a portion of the discharged air to be relieved to the atmosphere or by controlling the rotational speed of the supercharger.

12 Claims, 7 Drawing Figures

FUEL INTAKE CONTROL SYSTEM FOR SUPERCHARGED ENGINE

BACKGROUND OF THE INVENTION

The present invention relates to a fuel intake control system for a supercharged internal combustion engine.

The Japanese Laid-open Patent Publication No. 55-137314, laid open to public inspection on Oct. 27, 1980, discloses a fuel intake system for a supercharged engine which comprises a primary intake system and an auxiliary intake system including a supercharger driven by a drive unit, for example, the engine. This prior art fuel intake system is so designed that, when and so long as the load on the engine is smaller than a predetermined value, only the primary intake system is brought into operation to supply a combustible air-fuel mixture into the engine through an associated primary intake port, but when and so long as the load on the engine is larger than the predetermined value and at least during the period in which the engine undergoes the compression stroke, the auxiliary intake system is brought into operation together with the primary intake system to allow a supercharged air from the supercharger to be supplied into the engine through an associated auxiliary intake port.

This prior art system appears advantageous in that, since the supercharger is driven by the engine in contrast to a turbocharger driven by exhaust gases emitted from the engine, the supply of the supercharged air into the engine would not be short of the required amount even at a low speed engine operating condition during which the flow of the exhaust gases through the exhaust manifold tends to be retarded.

This publication also discloses the use of an auxiliary throttle valve, situated in the auxiliary intake passage downstream of the supercharger with respect to the direction of flow of the supercharged air towards the engine, and also a relief passage having a relief valve and bypassing the supercharger. The auxiliary throttle valve employed therein is so positioned and so designed as to allow the supply of the supercharged air in correspondence with change in load imposed on the engine.

However, in view of the fact that the supercharger is driven by the engine with its discharge pressure variable according to the engine speed and irrespective of the magnitude of the load on the engine, the supercharged pressure, that is, the pressure of the supercharged air emerging from the supercharger, tends to be high during a certain engine operating condition in which, while the supercharger is operated, the opening of the auxiliary throttle valve is small. This tendency is enhanced particularly during a low load and high speed engine operating condition in which, while the supercharger is driven at a high speed, the opening of the auxiliary throttle valve is small. This results in the increased driving resistance (torque) to the supercharger with the consequent increase of the fuel consumption of the engine. The increased driving resistance brings about the overheating of the supercharger which will adversely affect the servicing life of the supercharger. In addition, the increase of the driving resistance to the supercharger which takes place at the initial stage of the driving of the supercharger is likely to result in the abrupt change in engine power output.

SUMMARY OF THE INVENTION

Accordingly, the present invention has been developed with a view to substantially eliminating the disadvantages and inconveniences inherent in the prior art fuel intake system for the supercharged engine and has for its essential object to provide an improved fuel intake control system for the supercharged engine wherein means is provided for increasing the discharged pressure by the supercharger in responsee to increase of the load imposed on the engine.

Another important object of the present invention is to provide an improved fuel intake control system of the type referred to above, wherein the supply of the discharged air can, therefore, respond to the demand of the engine during a particular engine operating condition.

A further object of the present invention is to provide an improved fuel intake control system of the type referred to above, which is simple in construction, reliable in operation and reasonably inexpensive to manufacture.

According to the present invention, the means for increasing the discharged pressure by the supercharger in response to increase of the load on the engine is, in a preferred embodiment, constituted by a detector for detecting and generating an electrical signal indicative of the load on the engine during the operation of the latter and a supercharger control operable in response to the electrical signal from the detector for controlling the rotational speed of the supercharger. Specifically, when the load on the engine is high, the supercharger control operates to control the rotational speed of the supercharger to increase the discharged pressure.

In another preferred embodiment of the present invention, the discharged pressure increasing means is constituted by the detector and a relief valve control operable in response to the electrical signal from the detector to cause the relief valve to discharge a portion of the discharged pressure by the supercharger to the atmosphere. Specifically, when the load on the engine is high, the relief valve control operates to decrease the amount of the discharged pressure by the supercharger to to the atmosphere.

BRIEF DESCRIPTION OF THE DRAWINGS

These and other objects and features of the present invention will become clear from the following detailed description taken in conjunction with preferred embodiments thereof with reference to the accompanying drawings, in which.

DETAILED DESCRIPTION OF EMBODIMENTS

Figure 1:
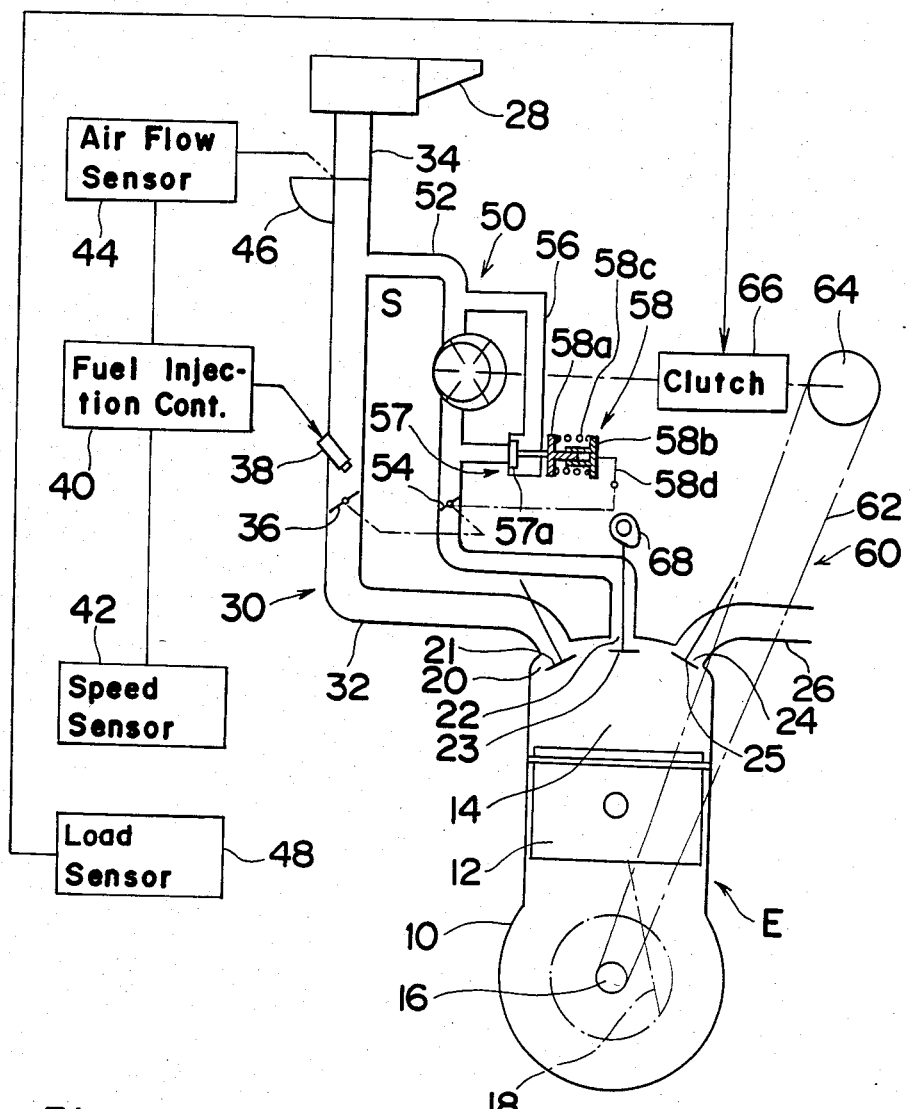
FIG. 1 is a schematic diagram showing a supercharged internal combustion engine together with its fuel intake control system according to a preferred embodiment of the present invention.

Before the description of the present invention proceeds, it is to be noted that like parts are designated by like reference numerals throughout the accompanying drawings. It is also to be noted that, although the concept of the present invention can equally be applicable to any known rotary piston engine, the present invention will be described in details as applied to a reciprocating piston engine.

Referring first to FIG. 1, there is shown an internal combustion engine E comprising a cylinder casing 10, a piston 12 accommodated axially reciprocately movably within the cylinder casing 10 and defining a combustion chamber 14 of variable volume in cooperation with the cylinder casing 10, and an engine power output shaft 16 operatively coupled to the piston 12 through a connecting rod 18 and adapted to rotate as the piston 12 undergoes a linear motion as is well known to those skilled in the art.

The engine E has a primary intake port 20, an auxiliary intake port 22 and an exhaust port 24 which are defined in the cylinder casing 10 in communication with the combustion chamber 14 and which are adapted to be selectively opened and closed by a primary intake valve 21, an auxiliary intake valve 23 and an exhaust valve 25, respectively, in a predetermined timed sequence. While the exhaust port 24 is communicated to the atmosphere through an exhaust manifold 26 with or without any known exhaust gas purifier installed on the manifold 26, the primary and auxiliary intake ports 20 and 22 are communicated to the atmosphere through primary and auxiliary intake systems, as will be described later, by means of an air cleaner 28 common to these intake systems.

The primary intake system, generally identified by 30, comprises a primary intake passage 32 having one end communicated to a common duct 34 which is in turn communicated to the atmosphere through the air cleaner 28, and the other end communicated to the primary intake port 20, a primary throttle valve 36 for regulating the flow of combustible air-fuel mixture to be supplied into the combustion chamber 14 and a fuel injection nozzle 38 positioned upstream of the primary throttle valve 36 with respect to the direction of flow of the air-fuel mixture towards the combustion chamber 14 and operable to inject fuel into the primary intake passage 32 under the control of a fuel injection control unit 40. As is well known to those skilled in the art, the fuel injection control unit 40 is adapted to receive an electrical signal indicative of the engine speed detected by an engine speed sensor 42, and an electrical signal indicative of the flow of air through the common duct 34 detected by an air flow sensor 44 and is operable to cause the injection nozzle 38 to inject fuel at a rate appropriate to a particular engine operating condition represented by a combination of the engine speed and the rate of flow of the air. The air flow sensor 44 so far shown comprises a known air flow meter 46 having a measuring plate disposed on the common duct 34 and a potentiometer (not shown) for converting the angular displacement of the measuring plate of the flow meter 46 into the electrical signal for the indication of the rate of flow of the air drawn into the primary intake passage 32.

The primary throttle valve 36 is, as is well known, controlled by a foot-operated acceleration pedal and, for this purpose, is operatively coupled to the acceleration pedal (not shown) by means of a suitable linkage system (also not shown).

The auxiliary intake system, generally identified by 50, comprises an auxiliary intake passage 52 having one end communicated to the common duct 34 and the other end communicated to the auxiliary intake port 22, a supercharger S, an auxiliary throttle valve 54 disposed downstream of the supercharger S with respect to the direction of flow of supercharged air towards the combustion chamber 14 for regulating the flow of the supercharged air to be supplied into the combustion chamber 14, and a relief passage 56 having a relief valve assembly 57 disposed thereon.

The supercharger S is comprised of, for example, a vane-type air pump and is adapted to be driven by the engine E through a drive transmisson system 60. The drive transmission system 60 in the embodiment shown in FIG. 1 comprises an endless belt 62 suspended around and between the engine power output shaft 16 and a pulley 64, and an electromagnetic clutch 66 for selectively coupling and decoupling the pulley 64 to and from the supercharger S, respectively.

The auxiliary throttle valve 54 is so operatively linked to the primary throttle valve 36 or, alternatively, the acceleration pedal if desired, that it can open only when and after the primary throttle valve 36 has been moved a predetermined angle from the substantially closed position towards the full open position, that is, when and after the load imposed on the engine E has exceeded a predetermined value.

The relief valve assembly 57 has a relief pressure variable according to the opening of the auxiliary throttle valve 54 in a manner as will subsequently be described and is operable to increase the discharge pressure of the supercharger S with increase of the load on the engine E. For this purpose, this relief valve assembly 57 comprises a relief valve member 57a positioned inside the relief passage 56 for controlling the effective cross-sectional area of the relief passage 56, and a relief valve control 58 positioned exteriorly of the relief passage 56 and comprised of first and second spring seat member 58a and 58b supported for telescopical movement relative to each other, a compression spring 58c interposed between the first and second spring seat members 58a and 58b so as to expand the members 58a and 58b in the opposite directions away from each other, and a linkage mechanism 58d operatively connecting the second spring seat member 58b to, for example, the auxiliary throttle valve 54. The first spring seat member 58a is connected to the relief valve member 57a for movement together therewith. The relief valve assembly 57 of the above described construction including the relief valve control 58 is so designed that, as the opening of the auxiliary throttle valve 54 becomes large, the second spring seat member 58b can be displaced against the compression spring 58c in a direction close to the first spring seat member 58a, thereby permitting the compression spring 58c to accumulate its axially outwardly acting biasing force.

The magnitude of the axially outwardly acting biasing force of the compression spring 58c of the relief valve control 58 determines the relief pressure of the relief valve assembly 57 and, accordingly, it is clear that the relief pressure of the relief valve assembly 57, i.e., the pressure at which the relief valve member 57a starts its movement to open the relief passage 56, increases with increase of the opening of the auxiliary throttle valve 54 and, hence, with increase of the load on the engine E. The increased relief pressure results in the reduced flow of air relieved through the relief passage 56 from a portion of the auxiliary intake passage 52 between the supercharger S and the auxiliary throttle valve 54 to the atmosphere and, therefore, the discharged air emerging from the supercharger S can be maintained at a relatively high pressure, the magnitude of which is determined by the rotational speed of the supercharger S.

Figure 2:
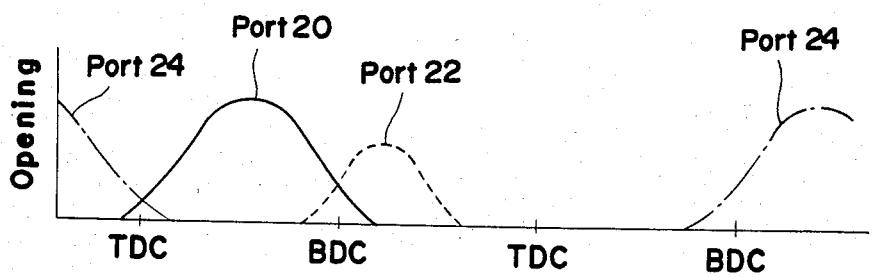
FIG. 2 is a schematic graph showing the respective timing at which a primary intake valve, an auxiliary intake valve and an exhaust valve are sequentially opened relative to the position of the engine piston.

The movement of the auxiliary intake valve 23 for selectively opening and closing the auxiliary intake port 22 is controlled by a timing cam 68. This timing cam 68 is so designed as to cause the auxiliary intake valve 23 to selectively open and close the auxiliary intake port 22 in timed relation to the opening and closing of the primary intake port 20. Specifically, the primary and auxiliary intake valves 21 and 23 are so timed that, as shown in FIG. 2 wherein the legends "TDC" and "BDC" represent the top dead center position and the bottom dead center position, respectively, of the piston 12, at the final stage of the opening of the primary intake port 20, that is, during the transit from the intake stroke to the compression stroke, the auxiliary intake port 22 opens in overlapping relation to the opening of the primary intake port 20.

A load sensor 48 for detecting the magnitude of the load imposed on the engine E, which may be either a throttle sensor for detecting the opening of the primary throttle valve 36 or a pressure sensor for detecting the magnitude of negative pressure inside a portion of the primary intake passage 32 between the throttle valve 36 and the engine E, is electrically connected to the electromagnetic clutch 66 for controlling the clutch 66 according to the load on the engine E. This load sensor 48 is capable of generating a first electrical signal when the load detected exceeds the predetermined value and a second electrical signal when the load detected is smaller than the predetermined value. As disclosed in our copending U.S. patent application, entitled "Fuel Intake System For Supercharged Engine" (based on Japanese patent applications Nos. 56-141344 and 56-150420, filed in Japan on Sept. 7 and 21, 1982, respectively, by the same assignee of the present invention), the load sensor 48 and the electromagnetic clutch 66 are so designed and so associated with each other that the clutch 66 can be energized in response to the first electrical signal from the load sensor 48 to drivingly couple the pulley 64 to the supercharger S during a high load engine operating condition in which the load on the engine E exceeds the predetermined value, but it can be deenergized in response to the second electrical signal from the load sensor 48 to disconnect the pulley 64 from the supercharger S during a low load engine operating condition in which the load on the engine E is smaller than the predetermined value.

From the foregoing, it has now become clear that during the low load engine operating condition, the load sensor 48 generates the second electrical signal and, therefore, the electromagnetic clutch 66 is not energized and no drive transmission from the pulley 64 to the supercharger S take place. Under this condition, no supercharged air is supplied into the combustion chamber 14 through the auxiliary intake passage 52, but only the air-fuel mixture is supplied thereinto through the primary intake passage 32. Thus, since the supercharger S is not driven when and so long as no supply of the supercharged air into the combustion chamber is required, only the air-fuel mixture is supplied into the combustion chamber 14 through the primary intake passage 32.

On the other hand, during the high load engine operating condition, the load sensor 48 generates the first electrical signal and, as a consequence, the electromagnetic clutch 66 is energized to allow the transmission of the drive from the pulley 64 to the supercharger S to drive the latter. At the same time, the auxiliary throttle valve 54 opens in association with the opening of the primary throttle valve 36, and, therefore, the supercharged air (discharged air) is supplied into the combustion chamber 14 through the auxiliary intake passage 52, thereby mixing with the air-fuel mixture which has been supplied thereinto through the primary intake passage 32. As the opening of the auxiliary throttle valve 54 becomes large with increase of the load on the engine E, the relief pressure of the relief valve assembly 57 represented by the axially outward biasing force of the compression spring 58c increase and, as a result thereof, the pressure of the supercharged air (discharged air) being fed into the combustion chamber 14 increases. Thus, the supercharged air (discharged air) can advantageously be supplied into the combustion chamber 14 in dependence on the load imposed on the engine E.

In the foregoing embodiment, the relief valve control 58 has been described as comprised of the telescopically movably supported first and second spring seat members 58a and 58b and the compression spring 58. However, it may be constituted by a diaphragm valve assembly as shown by 59 in FIG. 3.

Figure 3:
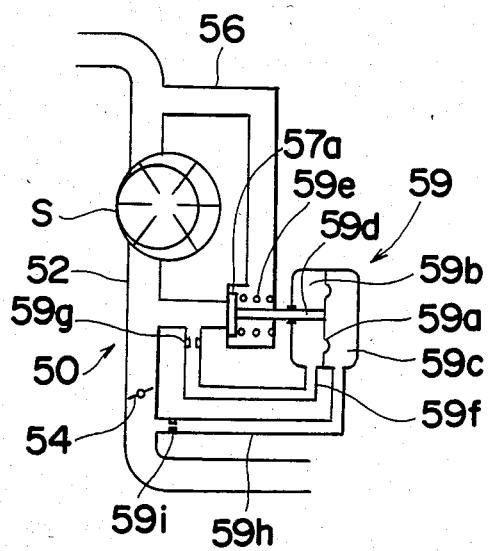
FIG. 3 is a schematic diagram showing a portion of the fuel intake control system which utilizes a modified form of relief valve control.

Referring now to FIG. 3, the diaphragm valve assembly 59 for controlling the relief valve member 57a comprises a valve casing having a diaphragm member 59a, which divides the interior of the valve casing into first and second working chambers 59b and 59c, an actuating rod 59d connected at one end to the diaphragm member 59a and at the other end to the relief valve member 57a, and a biasing spring 59e urging the relief valve member 57a to close the relief passage 56. The first working chamber 59b is communicated to the portion of the auxiliary intake passage 52 between the supercharger S and the auxiliary throttle valve 54 through a first passage 59f having an orifice 59g therein whereas the second working chamber 59c is communicated to a portion of the auxiliary intake passage 52 downstream of the auxiliary throttle valve 54 through a second passage 59h having an orifice 59i therein.

The diaphragm valve assembly 59 is so designed that, during the low load engine operating condition in which the opening of the auxiliary throttle valve 54 is small and, therefore, the pressure in that portion of the auxiliary intake passage 52 upstream of the auxiliary throttle valve 54 is higher than that in that portion of the auxiliary intake passage 52 downstream of the auxiliary throttle valve 54, the biasing force acting to urge the relief valve member 57a to close the relief passage 56 can be reduced and, hence, the relief pressure can be adjusted to a small value. However, as the opening of the auxiliary throttle valve 54 becomes large, the difference in pressure between the first and second working chambers 59b and 59c, that is, between the respective portions of the auxiliary intake passage 52 upstream and downstream of the auxiliary throttle valve 54, decreases allowing the biasing spring 59e to expand axially outwards and, therefore, the relief pressure is adjusted to a high value. Thus, it is clear that the relief pressure of the relief valve assembly increases with increase of the load on the engine E as is the case with the relief valve control in the foregoing embodiment.

It is to be noted that the orifices 59g and 59i provided in the first and second passages 59f and 59h, respectively, serve to avoid any possible adverse influence the pulsating flow of air in the auxiliary intake passage 52 may brought on the operation of the diaphragm valve assembly 59.

It is also to be noted that, although the relief valve member 57a in any one of the foregoing embodiments shown respectively in FIGS. 1 and 3 has been described as controlled in dependence on the opening of the auxiliary throttle valve 54, it may be controlled in dependence on the opening of the primary throttle valve 32 if desired.

In any one of the foregoing embodiments shown respectively in FIGS. 1 and 3, the discharged pressure during the drive of the supercharger S has been described as controlled by controlling the flow of the discharged air being relieved according to the load on the engine E. However, the control of the discharged pressure in dependence on the load on the engine E can also be achieved by adjusting the rotational speed of the supercharger S. This will now be described with reference to FIGS. 4 to 7.

Figure 4:
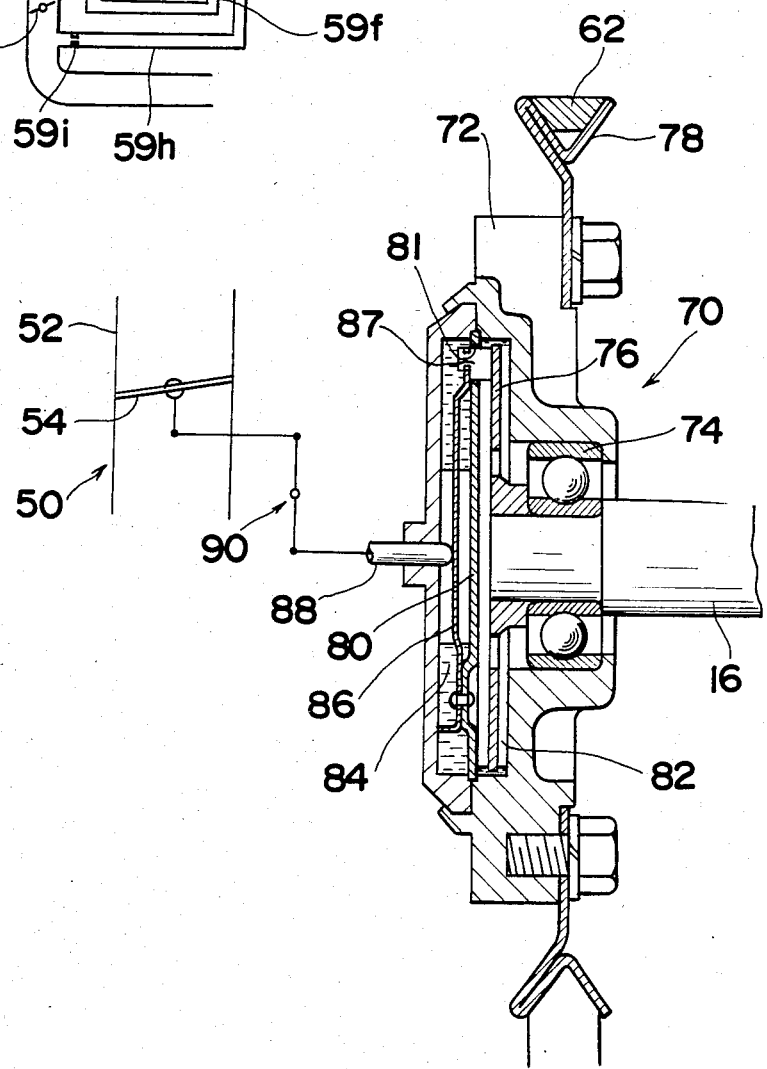
FIG. 4 is a side sectional view showing a fluid coupling used in the system according to another preferred embodiment of the present invention.
Figure 5:
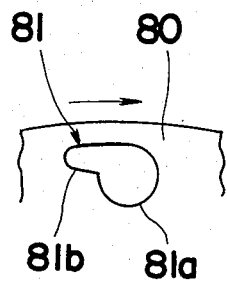
FIG. 5 is an elevational view, on an enlarged scale, showing a partition member used in the fluid coupling shown in FIG. 4.
Figure 6:
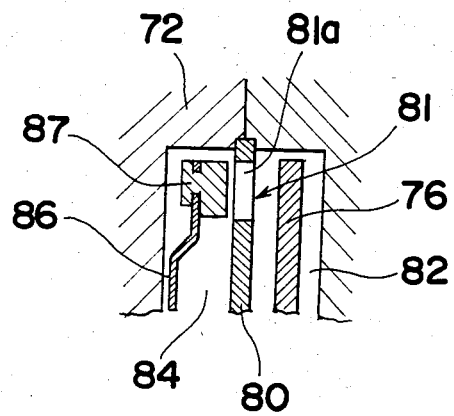
FIG. 6 is a side sectional view, on a somewhat enlarged scale, of a portion of the fluid coupling in a different operative position.

Referring particularly to FIGS. 4 to 6, the drive transmission system 60 (FIG. 1) includes a load-dependent control for controlling the rotational speed of the supercharger S. This load-dependent control is in the form of a fluid coupling 70 mounted on the power output shaft 16 of the engine E and around which the endless belt 62 is turned. The fluid coupling 70 comprises a casing 72 mounted rotatably on the power output shaft 16 through a ball bearing 74, a rotary disc 76 rigidly mounted on the shaft 16 for rotation together therewith, and a pulley 78 mounted on the casing 72 for rotation together therewith and around which the endless V-belt 62 is turned for transmitting the rotation of the casing 72 to the pulley 64. The interior of the casing 72 is divided by a partition member 80 into a first chamber 82, in which the rotary disc 76 is situated, and a second chamber 84 accommodating therein a lever 86 which has one end carrying a control valve member 87. The partition member 80 has a portion formed with an aperture 81 in alignment with the control valve member 87, said aperture 81 being, as best shown in FIG. 5, constituted by a circular aperture portion 81a and a generally triangular aperture portion 81b which is communicated to the circular aperture portion 81a and extends in a direction opposite to the direction of rotation of the partition member 80 and, hence, that of the casing 72. The control valve member 87 carried by the lever 86 is selectively engaged into and disengaged from the circular aperture portion 81a in the partition member 80 and, for this purpose, a plunger 88 is axially slidably supported by the casing 72 in alignment with the power output shaft 16 with its inner end engaged to a substantially intermediate portion of the lever 86. The outer end of the plunger 88 situated exteriorly of the casing 72 is so operatively associated with the auxiliary throttle valve 54 by means of a linkage mechanism 90 that, as the opening of the auxiliary throttle valve 54 becomes large, the plunger 88 can be displaced leftwards, permitting the control valve member 87 to disengage from the circular aperture portion 81a in a manner as best shown in FIG. 6. It is to be noted that the first chamber 82 is filled with a fluid medium, for example, oil for drive transmission.

The fluid coupling 70 of the above described construction operates in the following manner. Assuming that the engine E is in operation and the power output shaft 16 is rotated in one direction, when the opening of the auxiliary throttle valve 54 is small during the low load engine operating condition, the plunger 88 is biased towards the partition member 80 with the lever 86 consequently urged rightwards as viewed in FIG. 4 and, accordingly, the control valve member 87 projects into the circular aperture portion 81a in the partition member 80. At this time, because of the control valve member 87 engaged in the circular aperture portion 81a, the oil within the first chamber 82 flows into the second chamber 84 through the generally triangular aperture portion 81b in the partition member 80 with the amount of the oil in the first chamber 82 consequently decreasing. This flow is caused by an increased pressure near the triangular aperture portion 81b due to the impingement of fluid against the protruding control valve member 87. Therefore, the torque transmitted from the power output shaft 16 to the casing 72 through the rotary disc 76 is small and, accordingly, the pulley 78 is rotated at a low speed. Even though the low speed rotation of the pulley 78 results in the corresponding rotation of the pulley 64 through the endless belt 62, the rotation of the pulley 64 is not transmitted to the supercharger S because the electromagnetic clutch 66 is held in the decoupling position.

On the other hand, as the auxiliary throttle valve 54 is opened with increase of the load on the engine E, the plunger 88 is biased leftwards and the amount of projection of the control valve member 87 into the circular aperture portion 81a decrease gradually. As soon as the control valve member 87 is disengaged from the circular aperture portion 81a as shown in FIG. 6, the pressure differential near the triangular aperture portion 81b decreases and oil flows back to the chamber 82. Accordingly, the amount of the oil within the first chamber 82 increases in correspondence with the displacement of the control valve member 87 in a direction away from the circular aperture portion 81a and, consequently, the torque transmitted from the power output shaft 16 to the casing 72 through the rotary disc 76 increases, resulting in the increased speed of revolution of the casing 72. Thus, it will be seen that the rotational speed of the supercharger S can be controlled according to the load on the engine E and, specifically, the rotational speed of the supercharger S can be increased with increase of the load on the engine E. As has been described, during the high load engine operating condition, the electromagnetic clutch 66 is in the coupling position and, therefore, the rotation of the casing 72 is transmitted to the supercharger S through the belt 62, then pulley 64 and finally the electromagnetic clutch 66.

In the embodiment shown in FIGS. 4 to 6, the mechanical linkage mechanism 90 has been described as employed for transmitting the movement of the auxiliary throttle valve 54 to the plunger 88. However, an electric transmitting mechanism may be employed, which will now be described with particular reference to FIG. 7.

Figure 7:
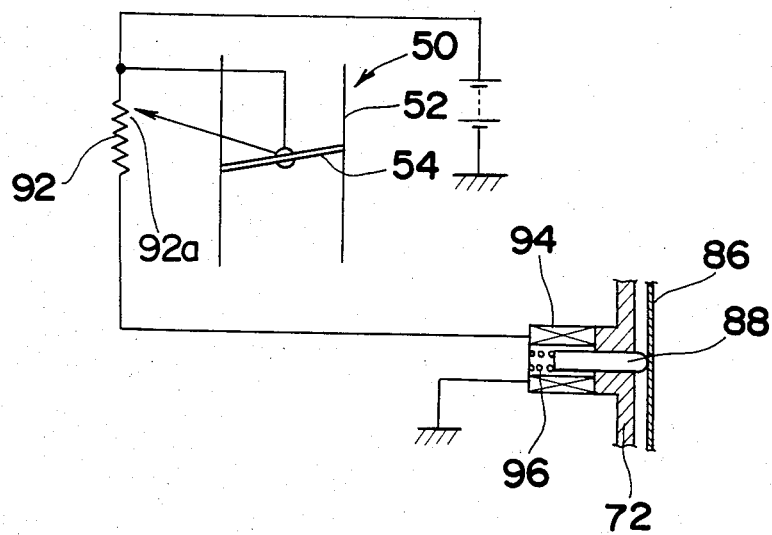
FIG. 7 is a schematic circuit diagram showing a modified form of the fluid coupling shown in FIG. 4.

Referring now to FIG. 7, the electric transmitting mechanism for transmitting the movement of the auxiliary throttle valve 54 to the plunger 88 comprises a potentiometer 92 having its movable tap 92a operatively coupled to the auxiliary throttle valve 54, and an proportionating solenoid 94 connected electrically in series with the potentiometer 92 and used to control the movement of the plunger 88. It will readily be seen that the potentiometer 92 detects an electric signal, the potential of which is a function of the position of the auxiliary throttle valve 54, and the proportionating solenoid 94 is energized by the electrical signal from the potentiometer 92 to move the plunger 88 rightwards as viewed in FIG. 7 against a biasing spring 96 which is used to bias the plunger 88 leftwards.

Although the present invention has fully been described in connection with the preferred embodiments thereof with reference to the accompanying drawings, it is to be noted that various changes and modifications are apparent to those skilled in the art. By way of example, in any one of the foregoing embodiments, an additional fuel injection system may be employed also in the auxiliary intake system 50 in a manner similar to that in the primary intake system 30. In addition, instead of the employment of the fuel injection system, a carburetor system may be employed.

So far as the embodiments shown respectively in FIGS. 4 and 7 are concerned, provided that the time lag between the respective timings at which the primary and auxiliary throttle valves 36 and 54 are opened be taken into consideration, the opening of the primary throttle valve 36 in the primary intake passage 32 may be used to control the fluid coupling 70. Moreover, instead of the employment of the fluid coupling 70, the load-dependent control may be constituted by an electromagnetic coupling and, in this case, the current to be applied to an electromagnetic coil of the electromagnetic coupling should be of a value variable with the load on the engine so that the rotational speed of the supercharger can be controlled.

Such changes and modifications are to be construed as included within the true scope of the present invention unless they depart therefrom.

We claim:

1. A fuel intake control system for an internal combustion engine having a combustion chamber, said control system comprising, in combination:
primary intake means for supplying a combustible air-fuel mixture to the combustion chamber during all engine operating conditions;
auxiliary intake means including a supercharger for supplying at least a supercharged air to the combustion chamber separately of air flowing through the primary intake means, said auxiliary intake means being operable during a high load engine operating condition to supply the supercharged air to the combustion chamber at least during a period in which the engine undergoes a compression stroke, said auxiliary intake means including an auxiliary throttle valve disposed therein downstream of the supercharger with respect to the direction of flow of the supercharged air towards the combustion chamber, said auxiliary throttle valve being operable to regulate the flow of the supercharged air to the combustion chamber in response to a load on the engine exeeding a predetermined value;
drive means driven by the engine for driving the supercharger to cause the supercharger to produce the supercharged air; and
control means for regulating the pressure of the supercharged air between the supercharger and the auxiliary throttle valve such that the pressure increases with an increased opening of the auxiliary throttle valve.

2. A system as claimed in claim 1, wherein said control means comprises a load sensor for detecting the load on the engine and a rotational speed control operable in response to a signal from the load sensor for increasing the rotational speed of the supercharger with increase of the load on the engine.

3. A system as claimed in claim 1, wherein said auxiliary intake means further includes passage means for relieving the air discharged by the supercharger and present between the supercharger and the auxiliary throttle valve, said control means including a sensor for detecting the opening of the auxiliary throttle valve and a relief control operable in response to a signal from the sensor for decreasing the amount of the supercharged air to be relieved through said passage means with an increase of the opening of the auxiliary throttle valve.

4. A system as claimed in claim 2, wherein said rotational speed control comprises a fluid coupling disposed between the drive means and the engine.

5. A system as claimed in claim 3, wherein said sensor comprises a linkage mechanism connected to the auxiliary throttle valve.

6. A system as claimed in claim 3, wherein said relief control comprises a relief valve member normally biased to close the passage means and adjusting means for increasing the biasing force used to bias the relief valve member to close the passage means with the increase of the opening of the auxiliary throttle valve.

7. A system as claimed in claim 1, wherein said primary intake means comprises a primary intake passage having one end open to the atmosphere and the other end communicated to a valve-controlled primary intake port, and a primary throttle valve disposed on the primary intake passage and operatively associated with an acceleration pedal for regulating the flow of the combustible air-fuel mixture therethrough; wherein said auxiliary intake means comprises an auxiliary intakes passage having one end open to the atmosphere and the other end communicated to a valve-controlled auxiliary intake port, said supercharger being disposed on said auxiliary intake passage, said auxiliary throttle valve being operatively connected with the primary throttle valve so as to open after the primary throttle valve has been opened a predetermined opening; and wherein said primary and auxiliary intake valves for controlling the primary and auxiliary intake ports, respectively, are so timed in synchronism with the rotation of the engine as to render the closure of the auxiliary intake port to be delayed a predetermined time relative to the closure of the primary intake port.

8. A system as claimed in claim 7, wherein said control means comprises a relief passage bypassing the supercharger for enabling a portion of the air, discharged by the supercharger and present between the supercharger and the auxiliary throttle valve, to be relieved to the atmosphere therethrough; a relief valve member disposed in the relief passage for controlling the effective cross-sectional area of the relief passage, a biasing element normally biasing the relief valve member so as to close the relief passage, and actuator means responsive to the difference in pressure between respective portions of the auxiliary intake passage upstream and downstream of the auxiliary throttle valve to decrease the biasing force to make the relief valve member close to relief passage in the event that the pressure in the portion of the auxiliary intake passage upstream of the auxiliary throttle valve is larger than the pressure downstream of the auxiliary throttle valve.

9. A system as claimed in claim 8, wherein said actuator means comprises a diaphragm valve assembly having a valve casing, a diaphragm member dividing the interior of the valve casing into first and second working chambers, an actuating rod connected at one end to the diaphragm member and at the other end to the relief valve member, a first conduit communicating the first working chamber to the portion of the auxiliary intake passage upstream of the auxiliary throttle valve, and a second conduit communicating the second working chamber to the portion of the auxiliary intake passage downstream of the auxiliary throttle valve.

10. A system as claimed in claim 1, wherein said auxiliary intake means comprises an auxiliary intake passage having one end open to the atmosphere and the other end communicated to a valve-controlled auxiliary intake port, said supercharger being disposed on said auxiliary intake passage, said auxiliary throttle valve being disposed on the auxiliary intake passage downstream of the supercharger and operable to selectively close and open the auxiliary intake passage when the load on the engine is smaller or larger than a predetermined value, respectively; and timing means synchronized with the rotation of the engine for controlling the timing at which the supercharged air is to be introduced into the combustion chamber at least during the period in which the engine undergoes the compression stroke.

11. A system as claimed in claim 5, wherein said relief control comprises a relief valve member normally biased to close the passage means, and adjusting means for increasing the biasing force used to bias the relief valve member to close the passage means with an increase of the opening of the auxiliary throttle valve.

12. A system as claimed in claim 11, wherein said relief control also comprises a biasing spring exerting said biasing force, said biasing force being increased by said adjusting means through the linkage mechanism in response to the increase of the opening of the auxiliary throttle valve.

* * * * *